United States Patent
Mogul et al.

(10) Patent No.: US 8,296,496 B2
(45) Date of Patent: Oct. 23, 2012

(54) MAIN MEMORY WITH NON-VOLATILE MEMORY AND DRAM

(75) Inventors: Jeffrey Clifford Mogul, Menlo Park, CA (US); Eduardo Argollo de Oliveira Dias, Jr., Barcelona (ES); Paolo Faraboschi, Sant Cugal Barcelona (ES); Mehul A. Shah, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 380 days.

(21) Appl. No.: 12/561,273

(22) Filed: Sep. 17, 2009

(65) Prior Publication Data

US 2011/0066790 A1 Mar. 17, 2011

(51) Int. Cl.
*G06F 12/00* (2006.01)

(52) U.S. Cl. .............. 711/102; 711/104; 711/E12.007
(58) Field of Classification Search .......... 711/102, 711/104
See application file for complete search history.

(56) References Cited

U.S. PATENT DOCUMENTS

| | | | |
|---|---|---|---|
| 2002/0051394 A1* | 5/2002 | Tobita et al. | 365/221 |
| 2003/0051104 A1* | 3/2003 | Riedel | 711/154 |
| 2006/0064539 A1* | 3/2006 | Mukaida et al. | 711/103 |
| 2007/0242771 A1* | 10/2007 | Kondo | 375/295 |
| 2008/0109629 A1* | 5/2008 | Karamcheti et al. | 711/170 |
| 2008/0130390 A1* | 6/2008 | Nakai et al. | 365/205 |
| 2010/0293420 A1* | 11/2010 | Kapil et al. | 714/710 |

* cited by examiner

*Primary Examiner* — Kevin Ellis
*Assistant Examiner* — Aracelis Ruiz

(57) ABSTRACT

One embodiment is main memory that includes a combination of non-volatile memory (NVM) and dynamic random access memory (DRAM). An operating system migrates data between the NVM and the DRAM.

22 Claims, 6 Drawing Sheets

Physical Memory Table

Page Table

MAIN MEMORY WITH NON-VOLATILE MEMORY AND DRAM

BACKGROUND

A dual in-line memory module (DIMM) includes a series of dynamic random access memory (DRAM) integrated circuits that are mounted on a printed circuit board in a computer. DIMMs are often used as main memory in computers since DRAM is structurally simplistic, inexpensive, and dense. DRAM packages are assembled into plug-in modules that are removable from the computer.

DRAM stores bits of data in separate capacitors that are periodically refreshed to maintain their charge. Data stored in the DRAM is volatile since the capacitors lose their charge if not refreshed.

DETAILED DESCRIPTION

Embodiments relate to systems, methods, and apparatus that build main memory of an electronic device from a combination of both dynamic random access memory (DRAM) and non-volatile memory (NVM), such as flash memory or Phase-Change RAM (PC-RAM).

One embodiment uses a hybrid of flash and DRAM for main memory in a computer or computer system. Although flash has relatively higher write latencies and wears out after relatively fewer writes when compared with DRAM, example embodiments include a design for hardware and operating system (OS) changes that compensate for these drawbacks in flash memory. At the same time, example embodiments utilize the fact of flash being denser (and hence cheaper) and more energy efficient than DRAM.

As discussed in more detail below, example embodiments build main memory of an electronic device (such as a personal computer or server) from a combination of NVM and DRAM. Some operations (such as writes for NOR flash and PC-RAM, and reads and writes for NAND flash) utilize DRAM buffering temporarily store data and match time constraints of a synchronous interface. This buffering is visible to the OS and affects policies for a page-migration implementation. Policies are also provided to avoid endurance problems with flash and determine which pages are migrated from DRAM to NVM. Slower write speeds (such as writes for NOR flash when compared with DRAM) cause the OS to utilize policies for managing page migration to flash.

Figure 1:
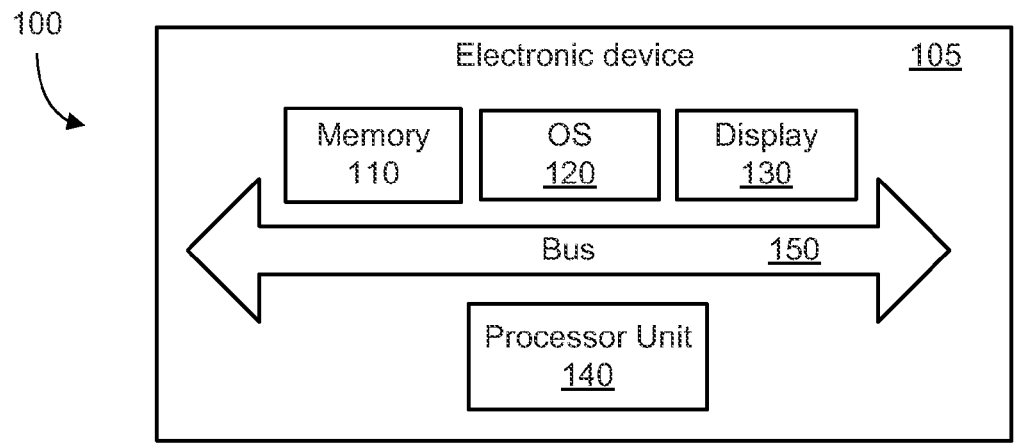
FIG. 1 shows a computer in accordance with an example embodiment of the present invention.

FIG. 1 is a block diagram of an electronic device 100 in accordance with an example embodiment of the present invention. The electronic device includes memory 110, operating system 120, display 130, processing unit 140, and one or more buses 150. The processor unit includes a processor (such as a central processing unit (CPU), microprocessor, application-specific integrated circuit (ASIC), etc.) for controlling the overall operation of memory 110 (such as random access memory (RAM) for temporary data storage, read only memory (ROM) for permanent data storage, and firmware). The processing unit 140 communicates with memory 110 via one or more buses 150. The memory 110, for example, includes main memory and stores applications, data, programs, algorithms (including software and code to implement or assist in implementing embodiments in accordance with the present invention), and other data.

The electronic device 100 in accordance with the present invention includes, but are not limited to, handheld computing devices, cellular or mobile phones, digital cameras, portable computers (such as notebook computers), servers, personal computers (PCs), workstations, tablet computers, mobile telephones, personal digital assistants (PDAs), televisions, combinations of these devices, and other portable and non-portable computing and/or electronic devices and systems.

Figure 2:
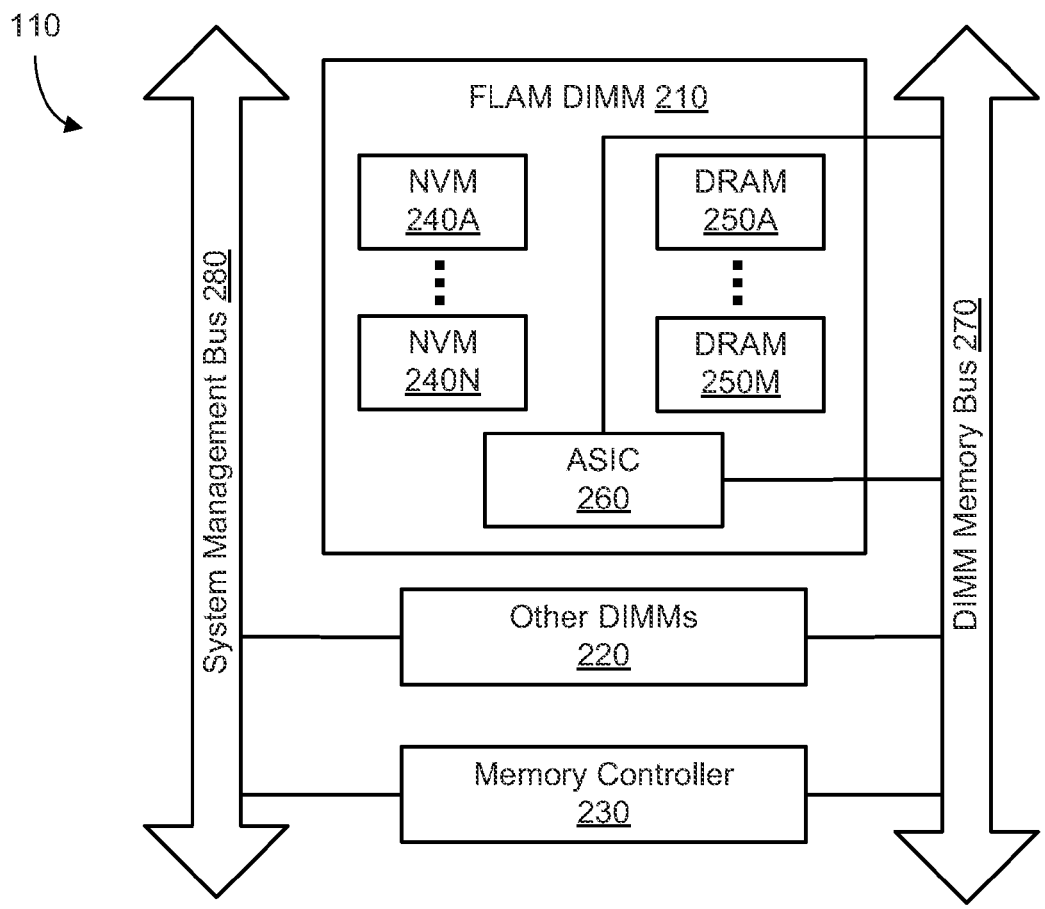
FIG. 2 shows a main memory of a computer in accordance with an example embodiment of the present invention.

FIG. 2 shows a memory (such as memory 110 of FIG. 1) in accordance with an example embodiment of the present invention.

In one example embodiment, memory 110 is a main memory. As used herein and in the claims, "main memory" is memory directly accessible to the CPU. For example, main memory is primary storage that connects to a processor using an address bus (which carries the memory address of the desired location) and a data bus (which is used to read or write the data).

Memory 110 includes a FLAM DIMM 210, one or more other DIMMs 220, and a memory controller 230. The FLAM DIMM 210 is a type of DIMM that includes both flash chips and DRAM memory (hereinafter referred to as FLAM). The FLAM DIMM 210 includes a plurality of NVMs (shown as NVM 240A to NVM 240N), a plurality of DRAMs (shown as DRAM 250A to DRAM 250M), and an ASIC 260 which couples to a DIMM memory bus 270. The other DIMMs 220 and memory controller 230 couple to a system management bus (SMB) 280.

The FLAM DIMM also includes the application-specific integrated circuit (ASIC) controller 260. As used herein and in the claims "dual in-line memory module" or "DIMM" is a series of dynamic random access memory integrated circuits in the form of modules mounted on a printed circuit board. DIMMs often provide main memory for personal computers, workstations, and servers. Furthermore, as used herein and in the claims, "dynamic random access memory" or "DRAM" is a type of volatile random access memory that stores each bit of data in a separate capacitor in an integrated circuit.

In one example embodiment, NVM 240A to NVM 240N are flash memory. As used herein and in the claims, "flash" or "flash memory" is non-volatile computer memory that is electrically erased and reprogrammed in blocks.

The operating system 120 of the electronic device 105 manages the way in which the combination of DRAM 250A-250M and NVM 240A-240N are used for main memory. For example, flash is used only for pages with a relatively high time-to-next-write (TTNW), since the penalties (latency and wear-out) for flash writes are higher than DRAM. As discussed more fully below, the OS determines an estimated time-to-next-write (ETTNW) for a page, and example embodiments identify OS-level information that assists in making these determinations.

Either NAND-based and/or NOR-based flash memory devices can be used with example embodiments as the NVM 240A-240N and other DIMMs 220. NAND flash does not directly allow a central processing unit (CPU) to make random-access read operations, so the ASIC 260 migrates to DRAM 250A-250M all pages that get accessed. NOR flash allows random-access read operations (but not write operations). In the case of a FLAM using NOR flash, migration is done in several cases. For example, migration can occur by the CPU from other DRAM (220) to the DRAM copy buffer (320) if the OS decides a page has a high ETTNW. Migration can also occur by the ASIC (260) from the CB (320) to the flash (310) on command from the CPU. Migration can also occur by the CPU from flash to DRAM (220) if there is an attempt to write the page. Alternate embodiments include other types of NVM memories, such as PC-RAM and PRAM, that do not utilize erase phases but include buffering to maintain the speed of write operations.

Given a potential impact on performance of migrating pages to and from DRAM 250A-250M, one embodiment uses NOR-based NVM devices 240A-240N. The CPU or processing unit 140 reads from the NOR flash as if it were a DRAM DIMM. Further, although writes to flash are slower than writes to DRAM, the CPU is not stalled during such writes. Furthermore, the CPU is not stalled during NOR flash erases.

One example embodiment is compatible with existing or legacy hardware systems used in computer systems. Spacing and a number of pins on the FLAM DIMM 210 coincide with slots on printed circuit boards used in personal computers and servers. For example, one embodiment is pin-compatible with standard DRAM DIMMs and memory controllers, such as DIMMs having 172 pins, 184 pins, 200 pins, etc.

Figure 3:
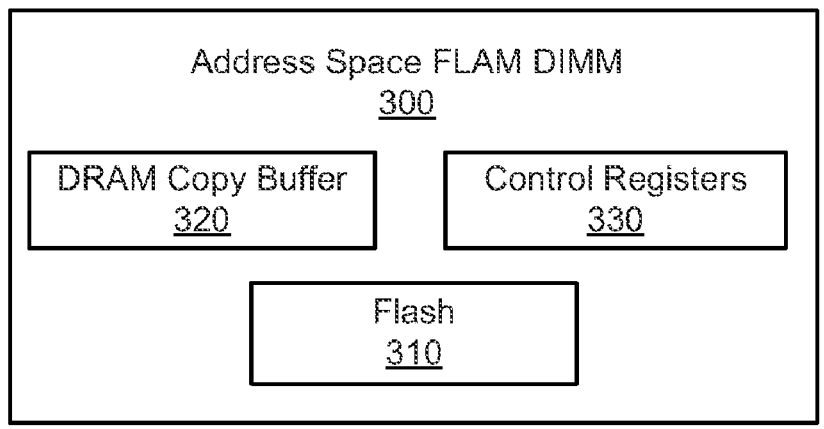
FIG. 3 shows address space for a FLAM DIMM in accordance with an example embodiment of the present invention.

FIG. 3 shows address space 300 of FLAM DIMM (such as FLAM DIMM 210 shown in FIG. 2). The address space 300 is divided into several regions that include flash 310, a DRAM copy buffer (CB) 320, and control registers 330.

The address space for the flash 310 is directly mapped for cache-line-wide reads (in case of NOR flash, or other NV devices that allow random read accesses). The CPU (processor 140 shown in FIG. 1) reads directly from this region. In case of devices (such as NAND flash) that do not allow any type of random accesses, the CPU would also not be able to read directly from this region.

The DRAM copy buffer 320 is mapped for both reads and writes by the CPU. The control registers 330 are accessed via a standard System Management Bus (SMBus 280 shown in FIG. 2) and mapped into input/output (I/O) space. The SMBus is a two-wire bus used for communicating with devices on a motherboard.

Figure 4:
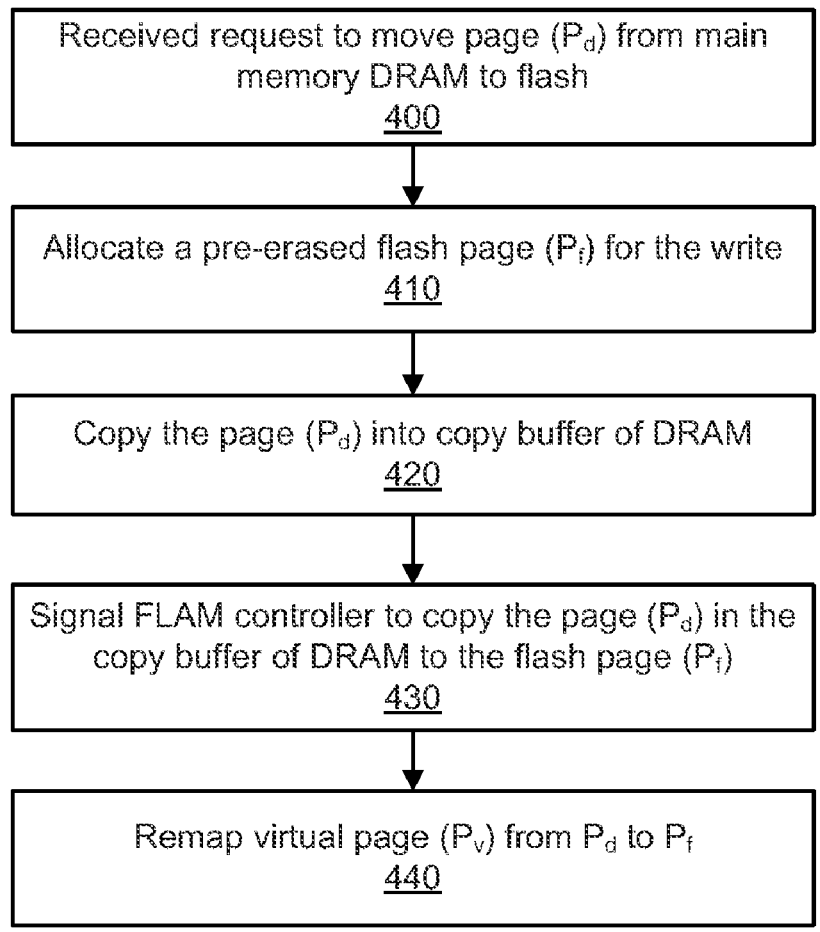
FIG. 4 shows a flow diagram for copying a page from main memory DRAM to flash in accordance with an example embodiment of the present invention.

Flash memory is erased before it can be written. Erasing flash tends to be relatively slow (which can stall the CPU), and is carried out in large blocks rather than individual words. Further, flash writes take longer than DRAM writes, so flash writes are not compatible with legacy memory controllers. These issues are resolved with the method of FIG. 4. More specifically, FIG. 4 shows a method for copying a page from main memory DRAM to flash.

According to block 400, a request is made to move a page ($P_d$) from main memory DRAM to flash.

According to block 410, an allocation is made for a pre-erased flash page ($P_f$) for the write.

According to block 420, the page ($P_d$) is copied into a copy buffer in the DRAM.

According to block 430, the FLAM controller is signaled to copy the page ($P_d$) in the copy buffer in the DRAM to the flash page ($P_f$).

According to block 440, a virtual page ($P_v$) is remapped from $P_d$ to $P_f$.

By way of example, the method of FIG. 4 is discussed in connection with FIGS. 1-3. Since NOR flash (NVM 240A-240N) cannot be written directly by CPU store operations, one embodiment stages page-sized writes in the CB 320. That is, when the OS 120 decides to move a page $P_d$ from main-memory DRAM 220 to flash memory (NVM 240A-240N), the OS 120 allocates a pre-erased flash page $P_f$, copies $P_d$ into a free page in the CB $P_b$ (DRAM 250A-250M), and then signals the FLAM controller (ASIC 260) to copy from $P_b$ to $P_f$. This copy can proceed at flash-write speeds (i.e., slowly) without stalling the CPU (processor 140). In order to sustain the necessary write bandwidth, the NOR flash is banked 8-16 ways. By banking the NOR flash and interleaving the data in each bank, example embodiments provide sufficient parallel access to reach the required write bandwidth. When the copy is finished, the memory controller 230 signals the OS 120, which remaps the corresponding virtual page $P_v$ from $P_d$ to $P_f$, and invalidates the TLB entry (some CPUs allow flushing one entry rather than the entire TLB.).

In one embodiment, the OS sets page table entries for $P_d$ (during migration) and $P_f$ (after migration) to be either read-only or read and execute. The OS performs these functions since writes during migration can lead to inconsistencies, and writes after migration cannot work. If software generates a store to one of these pages, a fault can occur. Before a write can proceed after a fault, the OS will either abort the migration (if the migration is still in progress) or copy the page back from flash to DRAM 220.

In case of the NVM 240A-240N being NAND flash (which cannot be directly read), the OS 120 instructs the FLAM to migrate all pages that are accessed. In this case, the CB operates as a cache of the NVM and filters all access to the NVM.

The signaling of the FLAM controller (ASIC 260) to the OS 120 is implemented through an interrupt based mechanism. Alternatively, signaling occurs through changing the I/O mapped control registers 330 exposed by the SMB interface. In this latter embodiment, the OS 120 starts a separate polling thread to implement an active wait until the FLAM signals completion of a pending operation, such as a migration to/from the NVM 240A-240N and the DRAM 250A-250M.

The ASIC controller 260 contains a programmable element (such as a microcontroller or microprocessor) with a memory implementing a set of commands that are used for the interface between the FLAM (240A-240N) and the OS 120. In this instance, a portion of the CB 320 is allocated or set aside to hold the specifics of commands from the OS 120 to the ASIC controller 260. Example commands include, but are not limited to, the following: for a copy command, the ($P_b$, $P_f$) pair; for an erase command, the offset and size of the sector(s) to erase. The ASIC controller 260 signals the OS 120 by setting a bit in this area. The OS polls this bit periodically (e.g., in its idle loop) since FLAM management operations are neither latency sensitive and nor require immediately notification provided by an interrupt.

Alternatively, the FLAM can expose a set of control registers in the SMB space where the OS passes the parameters and the commands to be executed by the controller.

Example FLAM commands include, but are not limited to, the following:
(1) copy CB ("DRAM copy buffer") page X to NOR page Y;
(2) copy NOR page X to NOR page Y (for compaction during Garbage Collection); and
(3) erase NOR block Z.

One embodiment supports multi-page or multi-block commands for more efficiency as following:
copy CB ("DRAM copy buffer") pages X . . . X+n to NOR pages Y . . . Y+n;
copy NOR pages X . . . X+n to NOR pages Y . . . Y+n (for compaction during Garbage Collection)
erase NOR blocks Z . . . Z+n
For n>=0.

Alternatively, the two kinds of copy commands can be combined into one such command whose source is either the CB or the NOR flash. The decision on whether to have separate kinds of commands depends on the specific addressing structure of components within the FLAM device.

Flash memory can wear out after a relatively small number of erase cycles. For storage, write bandwidths are slow enough to avoid this problem, but not main memory. For example, at 5 GB/s, a 256 GB of NOR can be worn out in less than 60 days.

To compensate for wearing of flash, the OS implements a wear-leveling for the FLAM. The OS tracks the allocation status (allocated, free, erased) and erase-count for each FLAM block and migrates pages to the erased block with the lowest erase-count. Since this metadata persists across crashes and reboots, it is stored in the FLAM for non-volatility. In one example embodiment, if the OS reads a FLAM page immediately after migration and compares it successfully to the source page, the OS can assume that the page has not yet worn out. If the comparison fails, the OS can abort the migration, and set an erase-count of the page to infinity. This approach could add more lifetime to a flash since flash writes damage the dielectric and cause wear-out.

One example embodiment provides for basic input/output system (BIOS) support. BIOS software might be confused by FLAM hardware in the main memory address space. Therefore, the BIOS is not aware of the NVM address space of the FLAM. The FLAM exposes the BIOS to only the DRAM part of the address space (for example, given that this address space is the only one that can be directly accessed without OS special support). So the BIOS and the initial OS boot sequence come from the DRAM address. Once a FLAM driver is executed, the OS queries the special FLAM register space (through the SMB) and identifies the extended FLAM size, as well as other properties that can be used to tune the heuristics.

With example embodiments, memory can be built using various types of NVM, such as NOR flash which has the characteristic that it can be read at a similar speed as DRAM. Other NVM technologies, currently available or developed in the future, can be used in a variant of the FLAM device. For example, NAND flash is less expensive and denser than NOR flash, but it cannot be read directly by the CPU at DRAM-like speeds. Therefore, a FLAM built using NAND flash migrates pages to DRAM before reading these pages. This migration can either be to DRAM DIMMs or to a portion of the Copy Buffer (CB) on the FLAM itself. In the latter case, the ASIC controller is given a command by the CPU to copy a page (or several pages) from a NAND region to the CB. When the copy is completed, the OS maps that CB page (or pages) into a page table as "present." In this case, the page table entry is marked as "read only," so that attempts to write the page cause a migration back to standard DRAM. The migration algorithm maintains an appropriate weight for such read-only mirrored pages so they are evicted first if they are not frequently read.

Other forms of NVM, such as Phase-Change RAM (abbreviated in various ways, including PCRAM or PRAM) and resistive RAM (RRAM) have somewhat different characteristics. For example, some of these technologies do not require a separate erase step. However, they might not accept writes as fast as standard DRAM, and so would still benefit from a FLAM design that buffers writes via the CB using the ASIC to copy data into NVM.

Discussion is now directed to providing OS support for hybrid main memories that include both DRAM and NVM. A set of OS extensions are provided to enable the use of a hybrid memory, composed of non-volatile (NV) memory and DRAM parts. These extensions operate at the page-level granularity and identify pages that are good or preferred candidates for migrating from the DRAM to the NVM. To make the migration decision, example embodiments use both static information (page properties known to the OS), as well as dynamic properties (access pattern estimations computed at runtime).

Example embodiments also consider which pages to store in FLAM. A relative small fraction of memory is kernel-private address space that cannot be readily migrated. However, pages used for user address space and file system buffering (which consume a large percentage of DRAM) are candidates for migration.

In one embodiment, the OS uses one or more policies to choose which pages to migrate to the FLAM. Such policies vary, depending on the hardware technology, and include, but are not limited to, one or more of the following:

(1) Page types: Operating systems tend to associate pages with type information. Code pages, for example, are good candidates for migration to FLAM and would take precedence over other pages, such as stack pages or non-file pages shared between two processes.
(2) File types: File types are indicators of ETTNW. For example, the local disk file size distribution includes executables, shared libraries loaded by executables, and fonts which are read only (read only also could include development databases, archives and installation packages).
(3) File reference modes: The Windows OS offers a temporary file attribute to optimize its buffer cache behavior. In one scenario, eighty-percent (80%) of files in a Windows file trace were deleted within 4 seconds of creation; and twenty-five to thirty-five percent (25%-35%) of these deleted new files can benefit from this attribute. As such, pages from files marked temporary are not migrated to FLAM.
(4) Application—supplied page attributes: Certain large, memory intensive applications that understand their workload, such as databases, could provide coarse ETTNW values for certain pages, such as index files.
(5) File names: The OS can record the historical TTNW distribution (or its smoothed mean) of otherwise hard-to-classify files; limiting this database (DB) to relatively large, frequently accessed files would maximize the benefits. Pages from a file with a large observed TTNW can be migrated to FLAM.

(6) Page history: The OS can track the TTNW for each page and migrate pages with high observed TTNW (assuming the DRAM space overhead for this tracking is not excessive).

Migration decisions and policies can also use other factors, such as how much free FLAM space is available, and tradeoffs between extra CPU load for migration versus inefficiency of running out of DRAM.

Some NVM characteristics make this type of memory less appealing in the memory system: the complexity of dealing with inefficient read/write random accesses, the lack of predictable timing compatible with synchronous interfaces, the wear-out effects that permanently damage the memory cells after a certain number of write cycles, and the need of some NV technologies (including flash) to erase entire large blocks before writing them. At the same time, NV memories are denser, cheaper, and more power-efficient than DRAM and can be completely powered down without losing data.

For at least these reasons, example embodiments provide OS support so NVM can be used in the memory system, such as main memory. Generally, this OS supports includes one or more of the following:

(1) Excessive writes to the NV memory are avoided by modifying the OS to selectively allocate only a subset of pages to the NV memory, and keeping the rest to the standard DRAM and disk memory system.
(2) Candidate pages are identified for migration to the NVM by combining static page properties and dynamic page properties.
(3) Example embodiments identify and estimate dynamic metrics that can be used to select the candidate pages to be migrated. These are the pages that are frequently used and show a long estimated time between writes.

Figure 5:
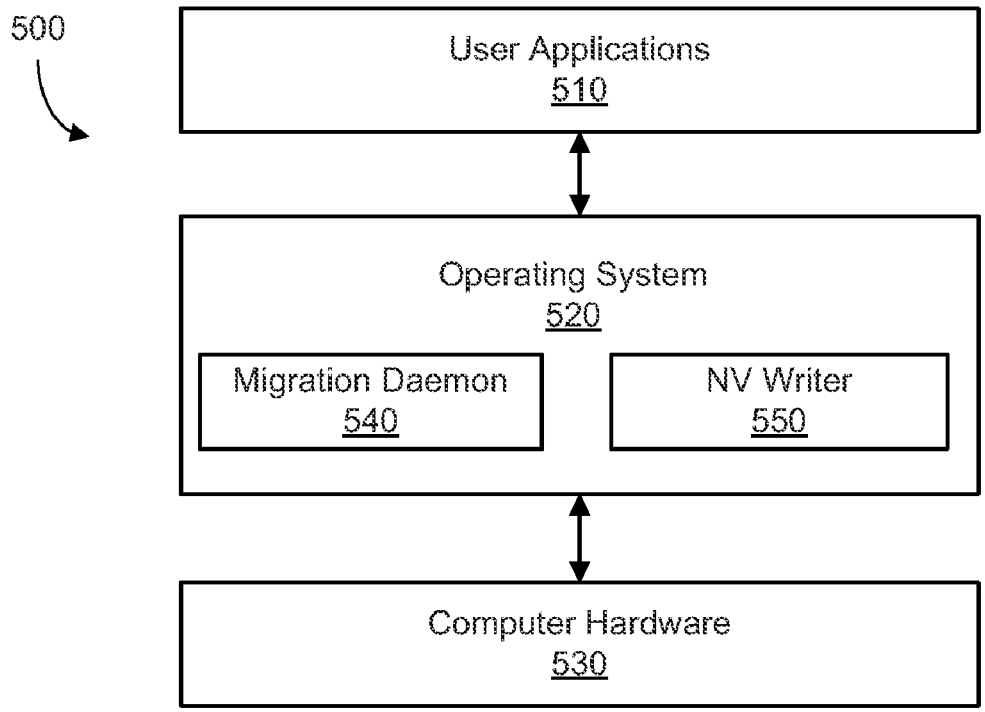
FIG. 5 shows a diagram of basic internal architecture of a computer in accordance with an example embodiment of the present invention.

FIG. 5 shows a diagram of basic internal architecture of a computer 500 that includes one or more applications 510, an operating system 520, and computer hardware 530. The operating system 520 further includes a migration daemon (MD) 540 and an NV writer 550. The operating system 520 generally provides an interface between the hardware 530 and a user and functions as a host for the applications 510 executing on the computer.

The migration daemon 540 is responsible for the selection of candidate pages to be migrated from DRAM to NVM. The migration daemon also collects and updates statistics to a private extension of the page descriptors. In order to be notified when an NV page needs to be written to, the migration daemon marks the migrated pages as non writeable so that a successive write will cause an exception and invoke the NV writer 550.

The NV writer 550 is an exception handler that is invoked whenever a page that is allocated to the NVM is written to. When a page that is allocated to the NVM is written to, it was previously marked as write protected so the write operation generates an exception that triggers the NV writer 550. The NV writer 550 evicts the page from the NVM and brings the page back to the DRAM (possibly making space by evicting another DRAM page to either the NVM or a disk). This way, the CPU can then proceed with the write as usual. The NVW also identifies writes that occur during a migration operated by the migration daemon 540 from DRAM to NVM. If such a write occurs, the copy is aborted. Since the source page is still in DRAM, no reallocation is necessary. But depending on whether the NV page has been updated at all, the page is marked as dirty and later erased.

The migration daemon 540 is activated (periodically and/or when there is an unmet demand for main-memory pages) to decide which, if any, pages are migrated from DRAM to NVM. In one embodiment, the migration daemon estimates which pages in DRAM are likely to be (a) frequently read and so merit being in main memory at all, and (b) not written soon (i.e., such pages have a long Estimated Time To Next Write (ETTNW) so that they are unlikely to trigger a write-fault exception once placed into NVM). In order to estimate which pages are frequently read, the OS keeps a record of frequently-used pages in main memory. Further, a page that the OS expects to be frequently-used in the future but which has a long ETTNW is, by definition, expected to be frequently-read since execute-access is defined as a read access and the only possible uses are read and write accesses.

Figure 6:
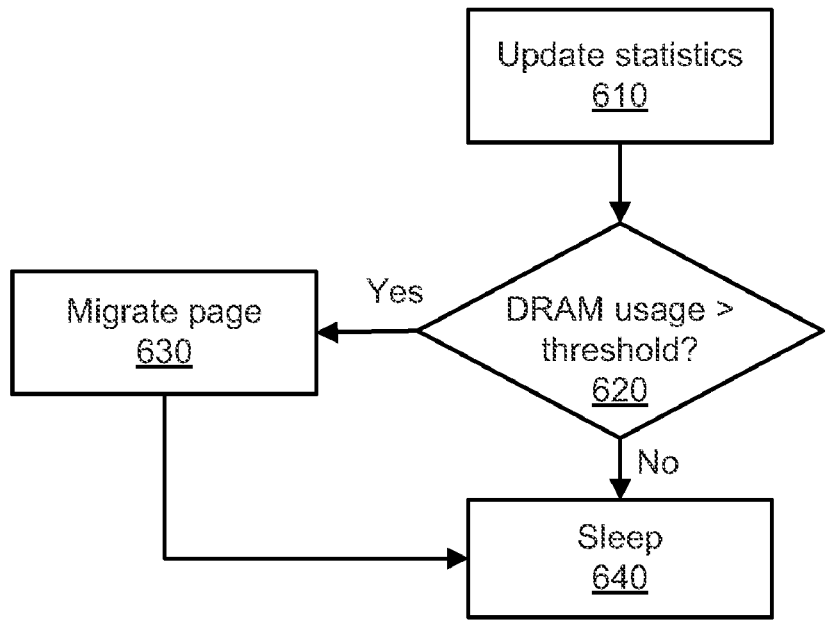
FIG. 6 shows a flow diagram of migration daemon flow in accordance with an example embodiment of the present invention.

FIG. 6 shows a flow diagram of migration daemon flow. According to block 610, the migration daemon updates the statistics. According to block 620, a decision is made as to whether DRAM usage is greater than a threshold. For example, the migration daemon checks if the physical memory usage has crossed a certain threshold (for example, if more than 70% of DRAM is being used). If the answer to question is "yes" (i.e., the threshold is being surpassed), then flow proceeds to block 640 and page migration occurs. Here, the migration process starts and moves the "best" candidates (as defined by the heuristics below) to the NVM. If the answer to the question is "no" (i.e., the threshold is not being surpassed), then page migration does not occur. According to block 640, the migration daemon sleeps after a predetermined time.

The migration daemon can use a variety of heuristics to compute the ETTNW for pages in memory. By way of example, such heuristics include, but are not limited to, the following:

(1) (H1): The OS-maintained type of the page; for example, does the page contain executable code, program stack, data, etc.? Information about per-page-type ETTNW can be computed by profiling the behavior of other systems, or by local profiles of the same system.

(2) (H2): If the page is mapped to a file, the type of the file; for example, is this a program executable, or a database index, or a word-processing file? Information about per-file-type ETTNW can be computed by profiling the behavior of other systems, or by local profiles of the same system.

(3) (H3) Per-page history; the OS can track statistics about the Time Between Writes (TBW) for each page (at a coarse time scale, by periodically scanning the accessed and dirty bits in the page table entries). For efficiency reasons, the OS maintains summary statistics (e.g., mean and variance) rather than a complete history. Pages with high mean TBW in the past (and perhaps low variance in their TBW) are predicted to have high TTNW. See below for an example of how to collect per-page History.

(4) (H4) Per-file history; the OS can track statistics about the Time Between Writes (TBW) for each file (at a coarse time scale, by periodically scanning the accessed and dirty bits in the page table entries). For efficiency reasons, the OS maintains summary statistics (e.g., mean and variance) rather than a complete history. Pages mapped to files with high mean TBW in the past (and perhaps low variance in their TBW) are predicted to have high TTNW.

(5) (H5) Per-application history; the OS can track statistics about the Time Between Writes (TBW) for pages statistically or dynamically allocated by each executable (at a coarse time scale, by periodically scanning the accessed and dirty bits in the page table entries). For efficiency reasons, the OS maintains summary statistics (e.g., mean and variance) rather than a complete history. Pages allocated by applications with high mean TBW in the past (and perhaps low variance in the TBW) are predicted to have high TTNW.

(6) (H6) Per-region history: for memory regions that are allocated but not mapped to a particular file, the OS can track TBW statistics for each region.

(7) (H7) API-specified pages or regions of memory: with the addition of a simple new kernel API, certain applications could be modified to report to the kernel their own estimates for the ETTNW for a particular page or set of pages. For example, a database application could tell the kernel that it expects certain index files to be primarily read only. Alternatively, a scientific computing application could tell the kernel that after a particular array is initialized with data, that array will be read only for the duration of the application. Similarly, the API can be used to tell the kernel that certain pages should no longer be expected to have a high ETTNW.

(8) (H8) If the CPU supports reading the Translation Lookaside Buffer (TLB) entries, the migration daemon traverses the TLBs of the CPUs and adds a corresponding "weight" to the entry corresponding to the pages it encounters. This way, over time, the pages with a higher weight indicate those that are frequently used and are good candidates for migration to NVM.

Figure 7:
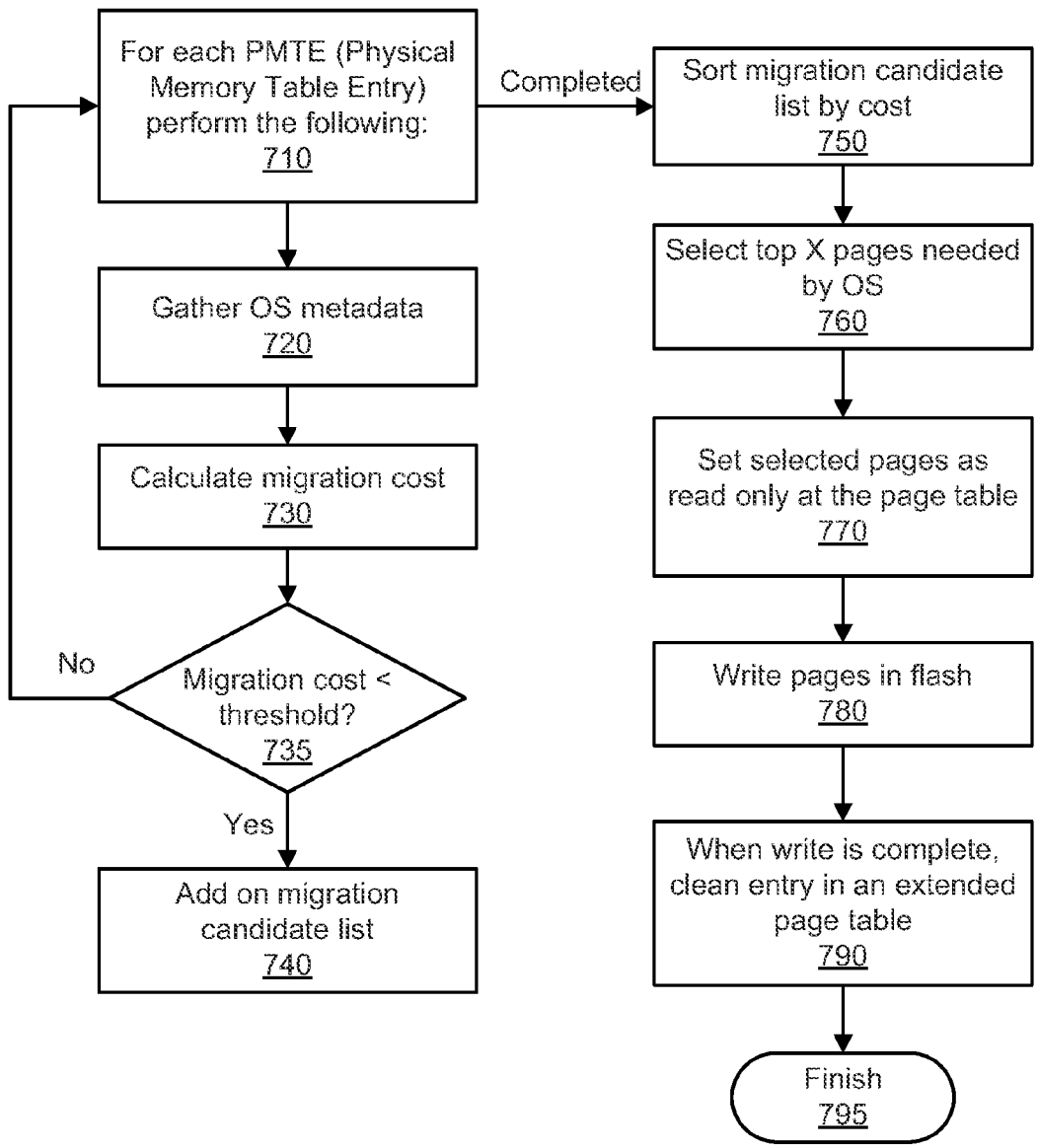
FIG. 7 is a flow diagram illustrating steps a migration daemon uses to decide how to combine a page in accordance with an example embodiment of the present invention.

FIG. 7 is a flow diagram illustrating steps a migration daemon uses to decide how to combine a page. According to block 710, for each physical memory table entry (PMTE), blocks 720-740 are performed. According to block 720, OS metadata is gathered, such as the heuristics discussed herein above. According to block 730, migration cost is calculated. A determination is then made at block 735 as to whether the migration cost is greater than a threshold. If the migration cost is not greater than a threshold then flow proceeds back to block 710. If migration cost is greater than the threshold, then flow proceeds to block 740 and the page is added to a migration candidate list. Once all pages are added to the list (i.e., the loop of blocks 710-740 is complete), then flow proceeds to block 750 wherein the migration list is sorted according to cost. According to block 760, a top number of pages are selected as being needed by the OS. The selected pages are set as being "read only" at the page table (PT) according to block 770. Pages are written to NVM or flash according to block 780 (for example, see flow diagram of FIG. 4). When the write from DRAM to flash is complete, a corresponding entry in an extended page table (XPT) for the page is cleaned at block 790. Flow ends at block 795.

In one embodiment, the migration daemon maintains additional data structures (either per-page-frame, or per-virtual page, or probably both) in the extended page table structure to record the data used for these heuristics. It can then combine the data to form an overall estimate of the ETTNW for each page (for example, using weights learned by analyzing traces of past behaviors).

The migration daemon can optionally decide to move a page back from NVM to DRAM, even if there have been no write operations for the page. This move occurs because of heuristics that predict that the page will be written soon, and there is no better use for that DRAM page. In one embodiment, the NVM-to-DRAM migration occurs when the system is somewhat idle, rather than waiting for the write-protect fault to occur, which would add latency to the application that causes the write-protect fault.

Discussion is now directed to collecting page histories. In one embodiment, the OS holds a per-process page table with an entry for every page in the process virtual memory. Among the page table data, some entries are of interest to the migration daemon. Such entries include, but are not limited to, the following:

(1) The Present Bit indicates whether a page table entry can be used in address translation. If Present=0 and an attempt to use this page is made then the processor signals a page exception (possibly the page is in swap space and the OS performs this swap).

(2) The Dirty Bit is set by the CPU whenever a page is written to.

(3) The Access Bit is by the CPU whenever a page is accessed (read or written).

In order to estimate the TTNW, one embodiment collects statistics of how frequently a page is written. For this purpose, one example embodiment uses a "Dirty Bit" to detect that a page has been written. In some CPUs (such as x86) with hardware support for page table walk, the page table data structure cannot be altered because the CPU relies on its structure and is caching some of the entries in the internal TLB cache. For this reason, in order to reset the "Dirty" and "Accessed" bits to collect statistics, a data structure that holds "shadow" copies of the real values is added. After flushing the TLB entries, the CPU will set the Dirty and Access bits again in the next sampling period, so that the migration daemon can detect whether an additional write or access operation occurred. For this purpose, the page table is extended (one entry for every physical memory page) with an "Extended Page Table" (XPT) as follows:

(1) Page Table Entry: the address of the page table entry that are mapped to this physical page (could be more than one if the page is shared across multiple processes).

(2) Shadow Dirty Bit: represents the dirty bit indicating that this physical page is dirty.

(3) Shadow Access Bit: indicates that this physical page was accessed.

(4) Non-Dirty Duration: counts the contiguous samples when the page was not dirty.

(5) Non-Dirty Count: accumulates the intervals (from Non-Dirty Duration) when this page was not written to.

(6) [if !supportLists]->•<!-[endif]-> Dirty Count: counts the samples when the page toggled from non-dirty to dirty.

(7) [if !supportLists]->•<!-[endif]-> Access Count: counts the samples where the page was accessed.

In order for the rest of the OS to function correctly, a change is made so the access methods to the Dirty and Access bits refer to the shadow copies. Supposing the OS uses the functions is_dirty (process_id, virtualpage_id) and is_access (process_id, virtualpage_id) to determine if the page is dirty or accessed, then the new version of these functions would do the similar search for the page table entry but use the Page Table Entry (PTE) to get the values in the extended page table (XPT) as follows:

```
bool is_dirty(process_id, virtualpage_id)
{
    pte=get_pte(process_id,virtualpage_id);
    return XPT[pte->physical_page_id].dirty;
}
bool is_access(process_id, virtualpage_id)
{
    pte=get_pte(process_id,virtualpage_id);
    return XPT[pte->physical_page_id].access;
}
```

Over time, as the migration daemon collects enough statistics for a page, the OS can estimate the average time between writes of a page by computing the ratio of the accumulated "Non-Dirty Count" counter divided by the "Dirty Count" counter, multiplied by the length of the sampling period of the migration daemon itself.

Figure 8:
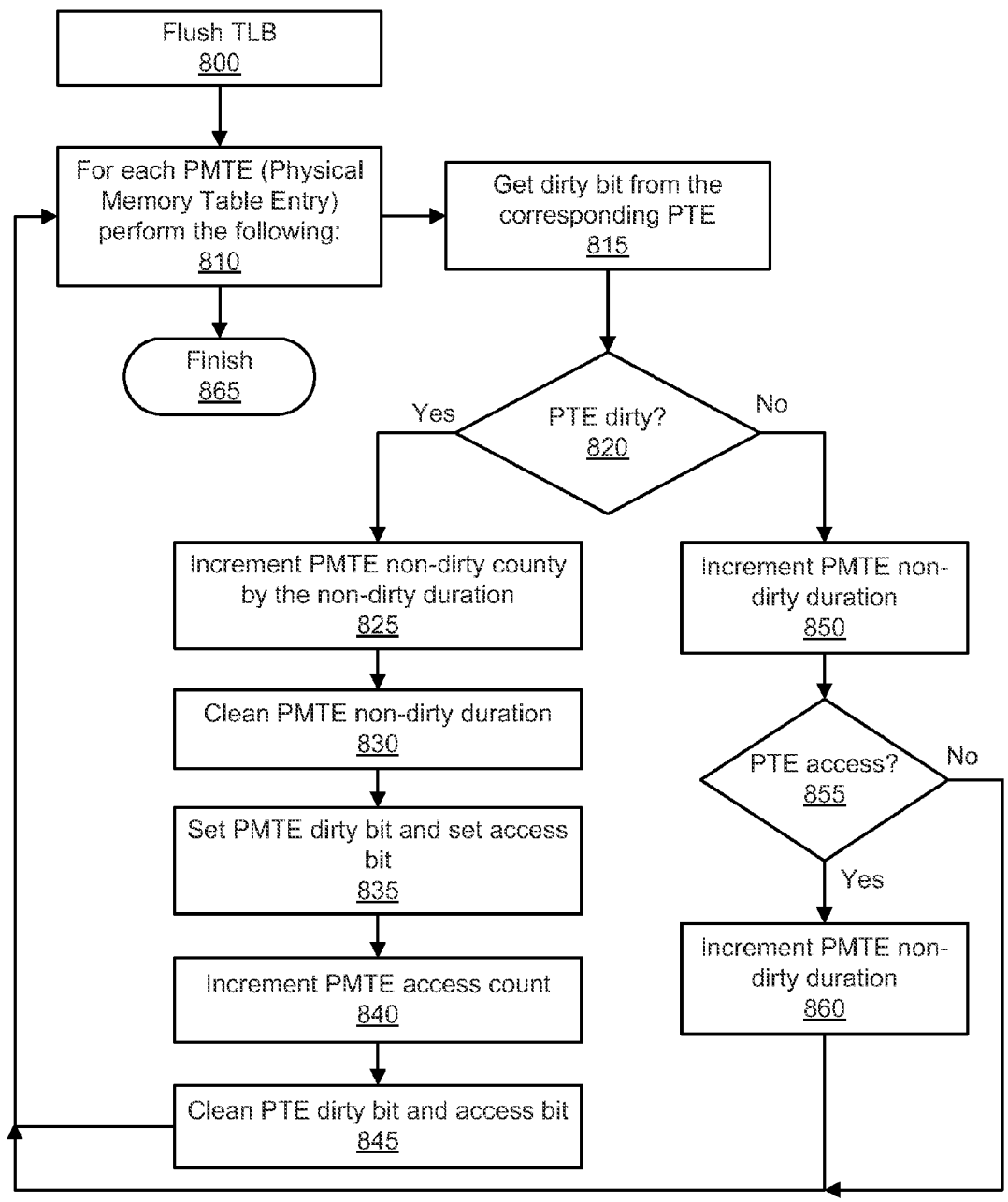
FIG. 8 shows a flow diagram that describes a statistics update part of the migration daemon responsible for collecting per-page access history in accordance with an example embodiment of the present invention.

FIG. 8 shows a flow diagram that describes a statistics update part of the migration daemon responsible for collecting per-page access history.

According to block 800, the TLB is flushed. In one embodiment, the TLB flush occurs before changing the page table (PT) entries to ensure that the CPU TLB is updated after the dirty and access bits are reset. For CPUs that support single-entry invalidations, it is also possible to only invalidate the entries that are modified.

According to block 810, for each physical memory table entry (PMTE), flow loops through blocks 815-860. According to block 815, a dirty bit is obtained from Page Table Entry (PTE). A determination is made at block 820 as to whether the PTE is dirty. If the bit is dirty, then flow proceeds to block 825, and the PMTE non-dirty count is incremented by the non-dirty duration. The PMTE non-dirty duration is cleaned at block 830, the PMTE dirty bit and access bit are set at block 835. At block 840, the PMTE access count is incremented, and the PTE dirty bit and access bit are cleaned at block 845. Flow then proceeds back to block 810. If the dirty bit is set (i.e., per the determination from block 820), then flow proceeds to block 850 where the PMTE non-dirty duration is incremented. A determination is then made at block 855 as to whether to access the PTE. If the PTE is accessed then flow proceeds to block 860, and the PMTE access count is incremented; otherwise flow proceeds back to block 810. After all bits are obtained, then flow ends at block 865.

Figure 9A:
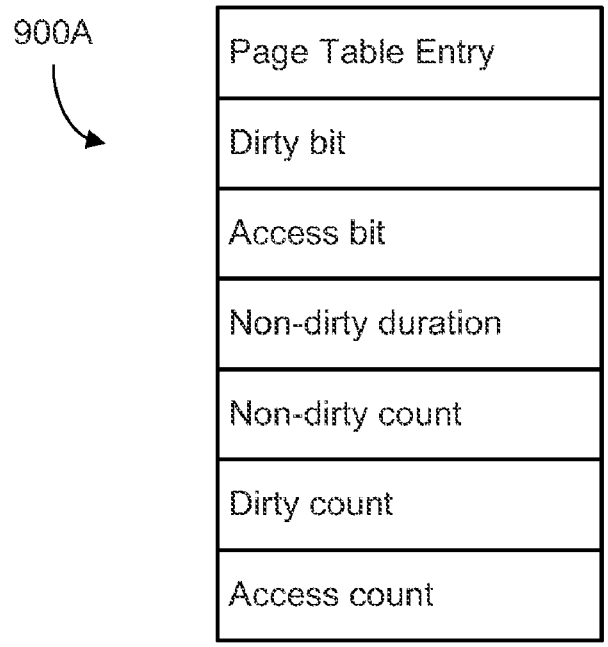
FIG. 9A shows a physical memory table in accordance with an example embodiment of the present invention.

FIG. 9A shows a physical memory table 900A that includes a plurality of rows storing values for a page table entry, a dirty bit, an access bit, non-dirty duration, non-dirty count, dirty count, and access count.

Figure 9B:
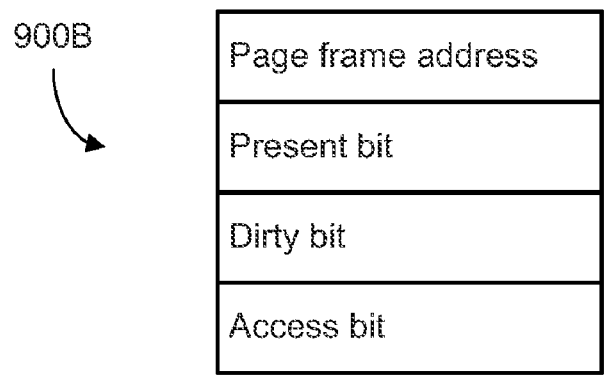
FIG. 9B shows a page table in accordance with an example embodiment of the present invention.

FIG. 9B shows a page table 900B that includes a plurality of rows storing values for a page frame address, a present bit, a dirty bit, and an access bit.

Example embodiments include a hybrid memory device that has a combination of NVM and DRAM where the allocation and migration of pages between the NVM and the DRAM are controlled by the operating system. As explained, in one embodiment, the OS uses a set of heuristics (described above) to decide when and how to migrate a page from DRAM to the NVM. This set of heuristics can be based on page properties known by the OS, dynamic page statistics collected by the OS through periodic sampling, an application level interface (API) that enables applications to communicate relevant properties to the OS, and/or on a history of pages collected from previous executions of a same program.

For NVM technologies that require erasing of multiple page blocks, the OS can implement various techniques to minimize occurrence of block erase operations. By way of example, these techniques include converting a partially used block into an erasable block by migrating the used page(s) from the block to another NVM block or back to DRAM, using NVM allocation to ensure that pages with similar expected lifetimes are allocated to a same erase block (for example, pages belonging to one mapped file are allocated to a same erase block, or pages with similar ETTNW are mapped to a same erase block), and a preemptive de-allocation of a page from NVM to DRAM based on predictive heuristics that predict that the page will be written.

Example embodiments also provide a set of extensions to the page descriptor data that the OS associated to every page. By way of example, these extensions include data to keep track of when the last write to the page occurred, data to keep track of non-memory resident pages, data associated to objects the pages refer to (e.g., files), and data to store application-dependent information (e.g., database indexes and hints).

An example embodiment also includes a technique implemented by the migration daemon to protect the pages migrated to the NVM as non-writable so the OS can be notified when a CPU attempts to write a page in NVM. When this situation occurs, corrective actions can be taken (e.g., migrate the page back to DRAM).

Techniques used by the migration daemon to estimate the TTNW and the access pattern of the page include keeping a shadow copy of the dirty bit and changing the OS access to the dirty bit to the shadow copy so the CPU can reset the dirty bit on subsequent writes, keeping a shadow copy of the access bit and changing the OS access to the access bit to the shadow copy so the CPU can reset the access bit on subsequent accesses, and accumulating the count of dirty and access samples to that aggregated statistics can be computed by the migration daemon.

One embodiment uses the OS to find good or preferred candidates to migrate to the NVM. These candidates are determined with different sets of heuristics that utilize information only available at the OS (e.g., information regarding knowledge of pages, cached files, etc.). When compared with a hardware only solution, the OS-based approaches provide richer sets of information (page semantics) available to the OS to make a better migration selection. When compared with application-level approaches, the OS-based approaches provide much broader applicability. For example, the page allocation heuristics are transparent to the application (hence the applications do not need to be modified), and system-wide optimizations can be applied by the OS to match the characteristics of multiple applications running in parallel. Further, OS approach is also compatible with application-level hints that can be supported by an appropriate API that the OS can expose to the applications that desire to pass additional information about the expected usage of some of their data structures.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit the invention.

In the various embodiments in accordance with the present invention, embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An electronic device, comprising:
   main memory that includes a combination of non-volatile memory (NVM) and dynamic random access memory (DRAM);
   an operating system that:
      allocates and migrates data between the NVM and the DRAM based on pages and a set of heuristics to calculate a migration cost of each page;
      adds at least some of the pages to a migration candidate list based on the migration cost of the page and a predetermined cost threshold;
      sorts the migration candidate list based on the migration cost of each page in the migration candidate list;
      selects a top number of pages in the sorted migration candidate list that are needed by the operating system; and
      migrates the selected pages to the NVM.

2. The electronic device of claim 1, wherein the NVM is flash memory.

3. The electronic device of claim 1, wherein the operating system buffers the pages in a DRAM buffer while the pages are being migrated from the DRAM to the NVM to account for a slower write speed to the NVM.

4. The electronic device of claim 1, wherein the NVM and the DRAM are included on a dual in-line memory module (DIMM).

5. The electronic device of claim 1, wherein the operating system uses a policy that determines a time-to-next-write (TTNW) for pages stored in the DRAM to determine whether to migrate the pages from the DRAM to the NVM.

6. The electronic device of claim 1, wherein the operating system uses a policy that accounts for wear-out of the NVM to determine whether to migrate the pages from the DRAM to the NVM.

7. The electronic device of claim 1, wherein the NVM is phase-change random access memory (PC-RAM).

8. The electronic device of claim 1, wherein the set of heuristics includes a type of page to migrate to the main memory and a type of file to which the page is being mapped.

9. A dual in-line memory module (DIMM), comprising:
   a dynamic random access memory (DRAM);
   a flash memory coupled to the DRAM, wherein migration of data between the DRAM and the flash memory is controlled by an operating system,
   wherein the operating system:
      uses a set of heuristics to calculate a migration cost of migrating the data from the DRAM to the flash memory, wherein the data is in pages;
      adds at least some of the pages to a migration candidate list based on the migration cost of the page and a predetermined cost threshold;
      sorts the migration candidate list based on the migration cost of each page in the migration candidate list;
      selects a top number of pages in the sorted migration candidate list that are needed by the operating system; and
      migrates the selected pages to the flash memory.

10. The DIMM of claim 9, wherein the flash memory includes NAND flash or NOR flash.

11. The DIMM of claim 9, wherein data migrating between the DRAM and the flash memory is buffered to avoid delays caused by slower read or write speeds of the flash memory.

12. The DIMM of claim 9 further comprising, an application specific integrated circuit (ASIC) that copies data from a buffer to the DRAM during migration of the data from the flash memory to the DRAM.

13. The DIMM of claim 9 further comprising, a buffer that temporarily stores pages during migration of the pages to the flash memory.

14. The DIMM of claim 9, wherein the DIMM stores copy and erase commands for migrating data between the flash memory and the DRAM.

15. The DIMM of claim 9, wherein the operating system tracks an erase-count for the flash memory to determine where to migrate pages in the flash memory.

16. The DIMM of claim 9, wherein the set of heuristics includes a type of page to migrate to the DIMM and a type of file to which the page is being mapped.

17. A method implemented by a computer, comprising:
controlling, by an operating system, both where to allocate data and when to migrate the data from non-volatile memory (NVM) on a dual in-line memory module (DIMM) to dynamic random access memory (DRAM) on the DIMM, wherein the data is in pages;
calculating, by the operating system, a migration cost of migrating each page from the DRAM to the NVM;
adding, by the operating system, at least some of the pages to a migration candidate list based on the calculated migration cost of the page and a predetermined cost threshold;
sorting, by the operating system, the migration candidate list based on the calculated migration cost of each page in the migration candidate list;
selecting, by the operating system, a top number of pages in the sorted migration candidate list that are needed by the operating system; and
migrating, by the operating system, the selected pages to the NVM.

18. The method of claim 17 further comprising, using, by the operating system, a set of heuristics to determine when to migrate the data to the NVM, wherein the set of heuristics includes statistics about time between writes (TBW) for the data being migrated.

19. The method of claim 17 further comprising, using, by the operating system, a set of heuristics to determine when to migrate the data to the NVM, wherein the set of heuristics includes a type of page being migrated to the DRAM and a type of file to which the page is being mapped.

20. The method of claim 17 further comprising, moving a page back from the DRAM to the NVM when the operating system predicts the page will be written.

21. The method of claim 17 further comprising, collecting, by the operating system, data on how frequently a page is written to determine a time to next write for the page.

22. The method of claim 17 further comprising, minimizing occurrence of block erase operations in the NVM to decrease a wear-out of the NVM.

* * * * *

UNITED STATES PATENT AND TRADEMARK OFFICE
CERTIFICATE OF CORRECTION

| | |
|---|---|
| PATENT NO. | : 8,296,496 B2 |
| APPLICATION NO. | : 12/561273 |
| DATED | : October 23, 2012 |
| INVENTOR(S) | : Jeffrey Clifford Mogul et al. |

It is certified that error appears in the above-identified patent and that said Letters Patent is hereby corrected as shown below:

In the Claims:

In column 14, line 4, in Claim 1, delete "system:" and insert -- system; --, therefor.

Signed and Sealed this
Fourteenth Day of May, 2013

Teresa Stanek Rea
*Acting Director of the United States Patent and Trademark Office*